C. L. TRAVIS.
Grain-Band.

No. 160,972. Patented March 16, 1875.

Witnesses:
Alex Mahon
H. C. Barclay

Inventor
C. L. Travis,
by A. M. Smith,
Attorney.

UNITED STATES PATENT OFFICE.

CHARLES L. TRAVIS, OF GREAT VALLEY, NEW YORK, ASSIGNOR TO THE GRAIN-BINDER COMPANY, OF FREMONT, OHIO.

IMPROVEMENT IN GRAIN-BANDS.

Specification forming part of Letters Patent No. 160,972, dated March 16, 1875; application filed February 12, 1875.

*To all whom it may concern:*

Be it known that I, CHARLES L. TRAVIS, of Great Valley, county of Cattaraugus, State of New York, have invented certain new and useful Improvements in Bands for Binding Grain, of which the following is a full, clear, and exact description, reference being had to the accompanying drawing, making part of this specification, in which—

Figure 1:
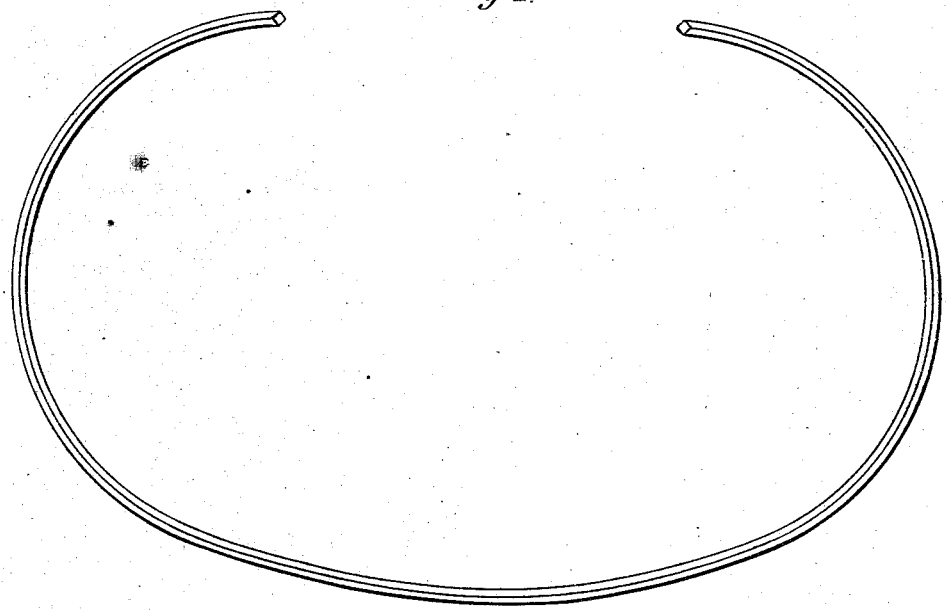
Figure 2:
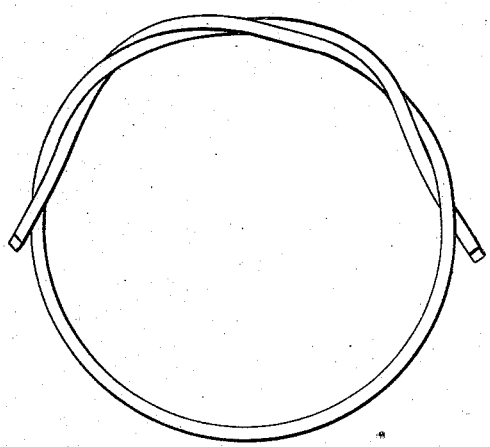

Figure 1 shows one of the bands curved for giving it a proportionate length in the illustration; and Fig. 2 represents the band with its ends united by interlacing or twisting.

In the various methods heretofore devised for binding grain the material employed for the band, whether binding by hand or by the aid of machinery, has consisted of straw taken either directly from the grain to be bound, or of long straw, especially selected and carried for the purpose, or of cord, twine, or wire. In the use of these various materials difficulties have been met with, which may be briefly stated as follows, viz: First, in the use of straw it has been found necessary to use selected straw for the bands, and as this had to be carried by the machine, its great bulk in connection with the complicated machinery necessary for grasping, twisting, applying, and tying the bands, rendered it objectionable. Second, the use of cord, twine, or like material, necessitated the tying of the ends of the bands into a firm knot, involving the use of complicated machinery of delicate construction. Besides this, it has been found that unless the grain is thoroughly cured before binding, the acid emanations from the straw in the process of curing or drying are liable to thoroughly saturate and destroy the fiber of the cord or twine bands, causing them to give way to the pressure of the grain. Third, in the use of wire it has been found that the acid emanations from the straw speedily corrode the wire, rendering it extremely brittle and liable to be broken, and portions of it entering the thrashing-machine, have either effected injury to the machine, or by reason of superior gravity have remained with the cleaned grain, and gone to the flouring-mill, where its presence has resulted in injury to the stones and bolts. Besides, where the grain is thoroughly dried or cured, the drawing of the fine-wire bands tightly around the bundles is found to cut or break the straw, causing the broken heads to become detached and wasted.

The object of my invention is to overcome the difficulties recited, by the employment of bands prepared from a material not liable to be affected by the acid emanations from the straw, because of its kindred nature in possessing a like woody fiber with the straw, and adapted to be carried in any desired quantities, because of its superior tensile strength, and consequently diminished bulk, while at the same time it is adapted to be easily and entirely removed in preparing it for the thrashing-machine, and hence not liable to become mingled with the straw carried thereto, and if from any cause the bands should pass into the thrashing-machine, no injurious effect can result therefrom, as they will as readily pass through the same, and be as easily separated from the grain as the straw itself; and to this end the invention consists in the employment of prepared bands made of wood, constructed and adapted for use in binding grain, as hereinafter described.

The bands are represented in the accompanying drawing, and are made of any suitable wood for the purpose, preferably of rock-elm, as being exceedingly tough in its nature, not liable to break, and adapted, even when thoroughly cured, to be readily bent into the desired circular form, and to permit the free twisting or interlacing of its ends for securing it in place upon the bundle, but such other woods of similar nature, as may be convenient, may be employed. These bands, of suitable length, are cut lengthwise of the grain of the wood, and are made preferably square or rectangular in form, and about three-sixteenths of an inch, more or less, in diameter, forming practically a wooden string or cord, the form described having been found most effective in practice for causing the twisted or interlaced ends to most firmly retain their grasp each upon the other, but other forms may be used, if desired. These bands may be applied either by hand in the field, or on machines carrying the binders, or they may be automatically applied by the use of devices similar to those described in another application of even date herewith, as the farmer may prefer.

It is designed to manufacture them in quantities, and to put them up in frames or packages of convenient form and size for the market, adapting them for use either upon hand or automatic binders.

Owing to the stiffness of the material and the resistance offered by the compressed bundle, the ends of the bands, when twisted and tucked between the band and the straw, are there held securely until released by hand.

The rectangular form of bands referred to possesses the further advantage of adapting them to be readily sawed in large quantities, thus reducing the expense of manufacture.

Having now described my invention, what I claim as new, and desire to secure by Letters Patent, is—

A prepared band made of wood, constructed and adapted for use in binding grain, substantially as described.

C. L. TRAVIS.

Witnesses:
ALEXANDER MAHON,
H. C. BARCLAY.